Patented Mar. 17, 1942

2,276,420

UNITED STATES PATENT OFFICE 2,276,420

FERMENTATION OF VEGETABLE WASTE

Bruno Rosenfeld, Rehovoth, Palestine

No Drawing. Application April 26, 1938, Serial No. 204,466. In Great Britain May 3, 1937

7 Claims. (Cl. 195—44)

This invention relates to commercial utilization processes, namely, the commercial utilization of some specific waste products rich in carbohydrates as made available by the citrus and apple juice manufacturing industries, such as citrus peel and apple pomace. Heretofore the commercial utilization of such waste, such as, for example, orange peel, consisted chiefly in the extraction of pectin and essential oils which form approximately one-fifth of the dry matter of the peel, the residual matter being disregarded.

The object of the present invention is to provide an improved process for the complete commercial utilization of such waste, namely, a process which uses, or also uses, the residual part, which had heretofore been ignored, namely the non-pectic part, or the fermentable carbohydrate.

I have found that in contradistinction to waste sugar liquors which are obtained for example in the manufacture of cane sugar or glucose— and which usually ferment with difficulty—the carbohydrates present in citrus peel or apple pomace ferment easily, the reason apparently being that they are associated with a relatively high amount of specific nutritive and activating constituents, which accelerate the transformation of such carbohydrates into utilizable products by suitable fermentation processes, for example by bacteria of the type of *Acetobutylicum*. It will be made clear in the following paragraph that the main difference between waste material containing ordinary fermentable carbohydrate, such as, for example, cane molasses, and waste material containing specific fermentable carbohydrate lies in the fact that a mash prepared with the former type does not ferment with micro-organisms having reduced synthesizing properties while the latter type, with which the present invention is concerned, does ferment easily with the type of organisms mentioned above, after removal of essential oils from the said carbohydrate.

Bacteria with reduced synthesizing properties require the addition of specific nutritive and activating substances which have not yet been fully investigated for the stimulation of their cell growth and their cell division, for the synthesis of their cell protoplasm, and in the case of certain anaerobic bacteria for the maintenance of a definite negative reduction potential. These specific requirements apply also, as I have found, to bacteria of technical interest, such as, e. g., *Clos. acetobutylicum* (Weizmann). Citrus peel, for example, a by-product of the canning and juice manufacturing industries containing a high percentage of carbohydrate, answers those specific requirements in such a high degree, that not only the carbohydrate of the same material can be successfully fermented but, as I have found, can be used successfully as a stimulant in the case of those carbohydrate containing materials which in themselves are lacking in these properties, and therefore ferment with difficulty.

Because of its high content in ascorbic acid (1-2.7 mg. per gram of dry peel) citrus peel offers an ideal medium for anaerobic fermentations such as, e. g., butanol acetone fermentation, and provides at the same time for the required negative reduction potential.

The invention consists in the utilization by fermentation of waste material containing carbohydrate which latter is characterized by a comparatively high content of specific nutritive and activating constituents as outlined above, for instance, the utilization of citrus waste such as, e. g., orange peel or apple pomace as obtained in the juice producing industries for a suitable fermentation process, of which fermentation with *Clos. acetobutylicum* (Weizmann) is a typical example.

The invention further consists in the fermentation of waste carbohydrates of the character referred to above by such micro-organisms with reduced synthesizing properties which require for their metabolism and propagation the presence of the stimulants and nutrients mentioned above.

The invention also applies to bacteria capable of living (i. e., fermenting) in media without any additional specific nutritive compounds.

The invention also consists in the use of carbohydrate waste material as characterized above for fermentation by means of butylic micro-organisms such as, for example, *Clostridium acetobutylicum* (Weizmann).

The invention also consists in the formation of new products from the pectic and cellulosic part of the fermentable raw material.

The invention also consists in processes as referred to above, applied for fermenting orange peel or grapefruit peel or even apple pomace with the type of bacteria mentioned above, and producing thereby products such as lower and higher aliphatic alcohols, e. g., ethanol or butanol, ketones such as acetone, aliphatic acids such as acetic acid.

The invention also consists in processes substantially as indicated above, using whole orange preferably freed from essential oils as a fermentation medium.

The invention also consists in the preparation by processes substantially as indicated above of a mixture of pectous substances characterized by their insolubility in 70% alcohol and by a partial solubility in 50% alcohol, and preferably the use of such substances as emulsifying agents, as stabilizers for colloidal solution of silver, gold and other metals of therapeutical value and as auxiliary substances for the textile industry, for example, as a stiffening agent.

The invention also consists in processes substantially as indicated above, yielding cellulosic constituents transformed into a fine mass which on washing and drying form a stable coherent cake of high mechanical strength without being brittle, which residue may be used for the manufacture of substitutes for or in combination with wood or paper or both or the like in suitable form for insulating walls or for any other suitable purpose.

The invention also consists in processes for the utilization of citrus and like wastes, substantially as herein described, and in products which may be made and especially when made by such processes.

The following examples are given as a further illustration of the invention:

*Example I. Fermentation media with orange peel*

To 1.5 kg. of fresh chopped orange peel (corresponding to 168 g. sugar) 3.7 kg. tap water are added. The mash is boiled and the steam condensed, 18.7 cc. of essential oils being collected from the condensate. The sterilized mash (4.2 kg.) is cooled and inoculated with 160 g. of a culture of Clostridium acetobutylicum (Weizmann) in 5% maize mash. At 37° C. the fermentation is finished after 40 hours; 77.4 ltr. gas being evolved. The yield of solvents is 57.6 gms, which includes 1.6 gms. of solvents derived from the maize mash inoculant used. 155 g. sugar of the 168 g. are fermented, and the yield of solvents calculated as percentage of the fermented sugar amounts to 36.1%.

*Isolation of the pectic substance and the cellulosic residue from the spent wash*

The spent wash is filtered from the cellulosic residue and the residue washed and dried. A stable coherent cake is obtained. The filtrate including the washings are evaporated to about 400 cc. and the pectic substance precipitated by the addition of 1.2 ltr. ethyl-alcohol. 70 g. of crude pectic substance (dry) are obtained.

*Example II. Fermentation media with grapefruit peel*

165 parts dry grapefruit peel (57.7 parts sugar) are made up to a mash of 1300 parts with tap water, 50 parts are withdrawn for inoculation with Clos. acetobutylicum (Weizmann). An intense fermentation is observed, lasting about 68 hours. 20 parts of solvents are obtained by distillation of the fermented mash, i. e., 34.7% calculated on total sugar. From the spent wash 20 parts dry pectic substance, 21 parts cellulosic residue, and 3 parts re-crystallized naringin were isolated.

*Example III. Fermentation media with orange peel extract*

470 parts dried orange peel containing 44.4% sugar (estimated as invert sugar), 7% water soluble and 13% acid soluble pectin, are extracted with water in three steps. The final extract contains 9.74% sugar.

*Butanol-acetone fermentation of the sugar extract*

200 parts of the sugar extract are made up to 500 parts with tap water, 3 parts asbestos fibre added, and the medium sterilized. The medium is inoculated with a culture of Clostridium acetobutylicum (Weizmann) in the same medium. A vigorous fermentation takes place, and 4.9 parts of solvents are obtained. 86.3% of the sugar has been fermented, and the yield of solvents amounts to 29.4% calculated on the amount of sugar fermented.

*Example IV. Fermentation media with apple pomace*

150 parts dry apple pomace (69 parts sugar) are made up to a mash of 1330 parts. An addition of nitrogenous substance corresponding to 2 parts asparagin is made, and the sterile mash inoculated with Clos. Acetobutyl (Weizmann). The fermentation is finished after 100 hours; 23.2 parts solvents are obtained from the mash by distillation, i. e., 33.7% calculated on total sugar. The pectic substance and the cellulosic residue may be isolated as described before.

*Example V. Fermentation media with orange peel and molasses*

A media containing 84.4 parts Egyptian cane molasses (42.2 parts sugar) are inoculated with a fermenting mash prepared from 38.5 parts orange peel (15.4 parts sugar) and inoculated with Clos. acetobutylicum (Weizmann). The fermentation is finished after 46 hours. 19.2 parts solvents are obtained after distillation of the fermented mash, i. e., 33.3% calculated on total sugar.

*Example VI. Fermentation of whole oranges*

2.6 kg. oranges (large fruit of low quality) are minced through a meat chopper. After sterilizing and removal of essential oils, the acid mash is neutralized to pH5 with sodium hydroxide, and made up to 4.6 kg. with tap water. The mash is inoculated with a culture of Clos Acetobutylicum (Weizmann). The yield is 32.4% of solvents calculated on the sugar. The spent wash may be filtered from the cellulosic residue, calcium chloride added to the filtrate, and the latter heated. 20 g. calcium citrate of 98% purity may be thus obtained. In the preceding examples parts means parts by weight, and the yields of solvents have been arbitrarily calculated on the basis of sugar present in the starting material.

*General*

Referring to the use of the term "specific" above, the meaning of the word "specific" may be best explained and defined by the following example: Mammalians require nitrogen for the synthesis of their cell protein. The protein cannot be synthesized from any and every source of nitrogen, but only from a "specific" or particular form of nitrogen, viz., in the form of different amino acids. The different amino acids are specific nutrients in this case. Mammalians require further for their normal subsistence small quantities of catalytically acting substances, called vitamins. These are substances which exercise a specific action and are of definite chemical composition. The type of bacteria to which the present invention exclusively refers also requires specific nutrients in the same way as mammalians, and also specific vitamins—I termed it "specific activators" as distinct from vitamins or activators broadly.

Not every carbohydrate containing waste material (e. g. molasses) contains these specific nutrients and specific activators. Citrus waste in contradistinction to molasses for example is rich both in suitable nutrients and suitable activator, and this is the reason why it is termed a "specific" waste material.

The nature and chemical composition of the substances which determine the "specificity" of the material are not yet known, and as in numerous other biochemical cases not yet fully investigated. The effect of these substances upon the fermentation can, however, be described.

The presence of ascorbic acid in the raw material used in this invention provides favorable conditions for anaerobes which even surpass the conditions offered by a maize mash. It is for example not necessary to remove the air through boiling the media before inoculation as it is usually practised in the case of a maize mash. The negative reduction potential is also provided for by the ascorbic acid.

The pectous substances prepared as described above are not suitable for the preparation of jellies, but they may be used as emulsifying agents, as stabilizers for colloidal solution of silver, gold and other metals of therapeutical value and as auxiliary substances for the textile industry, for example, as a stiffening agent.

As regards the cellulosic constituents obtained in fermentations as referred to above, these may be transformed into a fine mass which on washing and drying form a stable coherent cake of high mechanical strength without being brittle. This residue may be used for the manufacture of substitutes for or in combination with wood or paper or both or the like in suitable form for insulating walls, or for any other suitable purpose.

Turning to the use of apple pomace as a form of waste included under the term "citrus waste" for the present invention, this is fermented substantially as easily as citrus peel without additional activating and nutritive substances, as such substances are already contained in sufficient quantities in pomace, just as in the case of citrus waste.

The invention contemplates the employment of any fermentation process using citrus waste as a fermentation medium.

I claim:

1. A process for the utilization of waste products of the citrus and apple juice manufacturing industries according to which a sterilized mash of the above waste product is inoculated with *Clostridium acetobutylicum*, following which the mass is allowed to ferment and the fermented mash is treated for the isolation of its constituents.

2. A process as claimed in claim 1 wherein the mass before inoculation is treated for the removal of essential oils.

3. A process as claimed in claim 1 wherein the mass before inoculation is freed from essential oils and sterilized by a single steam treatment.

4. A process as claimed in claim 1 wherein the immediately prior to the step of fermenting a mash of other fermentable carbohydrates is added to the sterilized mass.

5. A process as claimed in claim 1 wherein the said isolation of the constituents of the mass comprises distilling the mass to yield volatile solvents and a spent wash.

6. A process as claimed in claim 1 wherein the said isolation of the constituents of the mass comprises distilling the mass to yield volatile solvents and a spent wash, the latter being filtered to yield a cellulosic residue and a filtrate.

7. A process as claimed in claim 1 wherein the said isolation of the constituents of the mass comprises distilling the mass to yield volatile solvents and a spent wash, the latter being concentrated by evaporation and then treated with alcohol to precipitate a pectic substance.

BRUNO ROSENFELD.